(12) United States Patent
Kim et al.

(10) Patent No.: US 10,427,708 B2
(45) Date of Patent: Oct. 1, 2019

(54) METHOD FOR CONTROLLING MOTOR DRIVEN POWER STEERING SYSTEM

(71) Applicant: HYUNDAI MOBIS CO., LTD., Seoul (KR)

(72) Inventors: Do Young Kim, Yongin-si (KR); Sang Min Ahn, Yongin-si (KR); Tae Hong Kim, Seongnam-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 354 days.

(21) Appl. No.: 15/403,395

(22) Filed: Jan. 11, 2017

(65) Prior Publication Data
US 2017/0197654 A1  Jul. 13, 2017

(30) Foreign Application Priority Data
Jan. 12, 2016 (KR) .......................... 10-2016-0003950

(51) Int. Cl.
*B60G 23/00* (2006.01)
*B62D 5/04* (2006.01)
*B62D 15/02* (2006.01)
*B62D 3/12* (2006.01)

(52) U.S. Cl.
CPC ......... *B62D 5/0463* (2013.01); *B62D 5/0457* (2013.01); *B62D 5/0469* (2013.01); *B62D 5/0472* (2013.01); *B62D 15/02* (2013.01); *B62D 3/126* (2013.01)

(58) Field of Classification Search
CPC .. B62D 5/0463; B62D 5/0457; B62D 5/0469; B62D 5/0472; B62D 15/02; B62D 3/126

USPC .................. 701/41, 42; 280/93.514; 180/446
See application file for complete search history.

(56) References Cited

U.S. PATENT DOCUMENTS

| | | | | |
|---|---|---|---|---|
| 4,842,090 A * | 6/1989 | Shimizu | ............... | B62D 5/0424 180/413 |
| 9,493,182 B2 * | 11/2016 | Kim | ...................... | B62D 5/046 |
| 2005/0224276 A1 * | 10/2005 | Sugitani | ................. | B62D 6/008 180/402 |
| 2010/0286869 A1 * | 11/2010 | Katch | ................... | B62D 5/0466 701/41 |
| 2011/0010053 A1 * | 1/2011 | Champagne | ......... | B62D 5/0469 701/42 |
| 2011/0066330 A1 * | 3/2011 | Kim | ..................... | B62D 5/0463 701/42 |
| 2011/0153162 A1 * | 6/2011 | Kezobo | ................ | B62D 5/0463 701/42 |

(Continued)

FOREIGN PATENT DOCUMENTS

| | | | |
|---|---|---|---|
| JP | 2006-1329 A | † | 1/2006 |
| JP | 2006001329 | * | 1/2006 |

(Continued)

*Primary Examiner* — Shardul D Patel
(74) *Attorney, Agent, or Firm* — H.C. Park & Associates, PLC

(57) ABSTRACT

A method for controlling a motor driven power steering (MDPS) system includes detecting, by a controller, a current position of a rack bar; comparing, by the controller, the current position of the rack bar with a preset maximum position of the rack bar; updating, by the controller, the maximum position of the rack bar according to the comparison result; and setting, by the controller, a rack end stop control section using the updated maximum position of the rack bar.

13 Claims, 2 Drawing Sheets

(56) References Cited

U.S. PATENT DOCUMENTS

| | | | |
|---|---|---|---|
| 2012/0080861 A1* | 4/2012 | Park | B62D 3/126 280/93.514 |
| 2012/0194109 A1* | 8/2012 | Uryu | B62D 5/0403 318/400.15 |
| 2013/0289826 A1* | 10/2013 | Yoshitake | B62D 5/049 701/42 |
| 2014/0200771 A1* | 7/2014 | Yabuguchi | B62D 5/0493 701/41 |
| 2016/0159389 A1* | 6/2016 | Kuramitsu | B62D 5/049 180/446 |
| 2016/0305008 A1* | 10/2016 | Kim | C23C 8/26 |

FOREIGN PATENT DOCUMENTS

| | | | |
|---|---|---|---|
| JP | 2009-29285 A | † | 2/2009 |
| JP | 2009029285 | * | 2/2009 |
| JP | 2009-220735 A | † | 10/2009 |
| KR | 10-0247334 | | 4/2000 |

\* cited by examiner
† cited by third party

12 # METHOD FOR CONTROLLING MOTOR DRIVEN POWER STEERING SYSTEM

CROSS-REFERENCE TO RELATED APPLICATION

This application claims priority from and the benefit of Korean Patent Application No. 10-2016-0003950, filed on Jan. 12, 2016, which is hereby incorporated by reference for all purposes as if set forth herein.

BACKGROUND

Filed

Exemplary embodiments of the present invention relate to a method for controlling a motor driven power steering (MDPS) system, and more particularly, to a method that changes a rack end stop control section based on the current position of a rack bar of a vehicle.

Discussion of the Background

Examples of a power assisted steering system for reducing a driver's steering force during steering may include a hydraulic power steering system which provides a steering force through a hydraulic pump and a MDPS system that controls a steering force using a driving torque of an electrical motor.

The above information disclosed in this Background section is only for enhancement of understanding of the background of the invention and, therefore, it may contain information that does not constitute prior art.

SUMMARY

Exemplary embodiments provide a method for controlling a MDPS system, which is configured to change a rack end stop control section based on a current position of a rack bar and detect an output limit value of the MDPS system based on the changed rack end stop control section, thereby avoiding a performance difference caused by a mass production and distribution of rack bar lengths.

Exemplary embodiments also provide a method for controlling a MDPS system, which is configured to reduce an impact caused by a collision between a stopper of a rack bar and an inner ball joint (IBJ) socket (housing) of a gear box, thereby reducing noise caused by the impact while preventing a mechanical damage of vehicle parts.

In an exemplary embodiment, a method for controlling a MDPS system may include: detecting, by a controller, a current position of a rack bar; comparing the current position of the rack bar with a preset maximum position of the rack bar to generate a comparison result; updating the maximum position of the rack bar according to the comparison result by the controller; and setting a rack end stop control section using the updated maximum position of the rack bar by the controller.

When the current position of the rack bar exceeds the preset maximum position of the rack bar, the controller may update the maximum position of the rack bar to the current position of the rack bar.

The controller may change and set the rack end stop control section based on a difference between the current position of the rack bar and the maximum position of the rack bar.

The controller may shift the rack end stop control section by the difference between the current position of the rack bar and the maximum position of the rack bar.

In an exemplary embodiment, a method for controlling a MDPS system may include: detecting, by a controller, a current position of a rack bar; obtaining a maximum position of the rack bar based on the current position of the rack bar; setting a rack end stop control section based on the maximum position of the rack bar by the controller; determining whether the current position of the rack bar reenters the rack end stop control section by the controller; and controlling an output torque of a motor according to the rack end stop control section by the controller, when the current position of the rack bar reenters the rack end stop control section.

The setting of the rack end stop control section may include: comparing the current position of the rack bar with a preset maximum position of the rack bar to generate a comparison result; updating the maximum position of the rack bar according to the comparison result; and setting the rack end stop control section using the updated maximum position of the rack bar.

When the current position of the rack bar exceeds a preset maximum position of the rack bar, the controller may update the maximum position of the rack bar to the current position of the rack bar.

The controller may change the rack end stop control section depending on a difference between the current position of the rack bar and the maximum position of the rack bar.

The controller may shift the rack end stop control section by the difference between the current position of the rack bar and the maximum position of the rack bar.

The controlling of the output torque of the motor may include: detecting a final output limit value of the motor based on at least one of the current position of the rack bar, a moving speed of the rack bar, and a preset vehicle speed gain; detecting an output control value of the motor based on at least one of a steering angle, a steering torque and the preset vehicle speed gain; comparing the detected output control value with the final output limit value to generate an output comparison result; and controlling the output torque of the motor according to the output comparison result.

The detecting of the final output limit value of the motor may include: detecting an initial output limit value of the motor based on at least one of the current position of the rack bar and the moving speed of the rack bar; and detecting the final output limit value by correcting the initial output limit value based on at least one of the moving speed of the rack bar and the preset vehicle speed gain.

The detecting of the final output limit value of the motor may include: detecting a damping output value based on at least one of a steering speed of a steering wheel, a rotation speed of the motor, and the moving speed of the rack bar; and detecting the final output limit value by subtracting the damping output value from the initial output limit value.

The controlling of the output torque of the motor may include control the output torque of the motor based on one of the final output limit value and the output control value, according to the comparison result.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
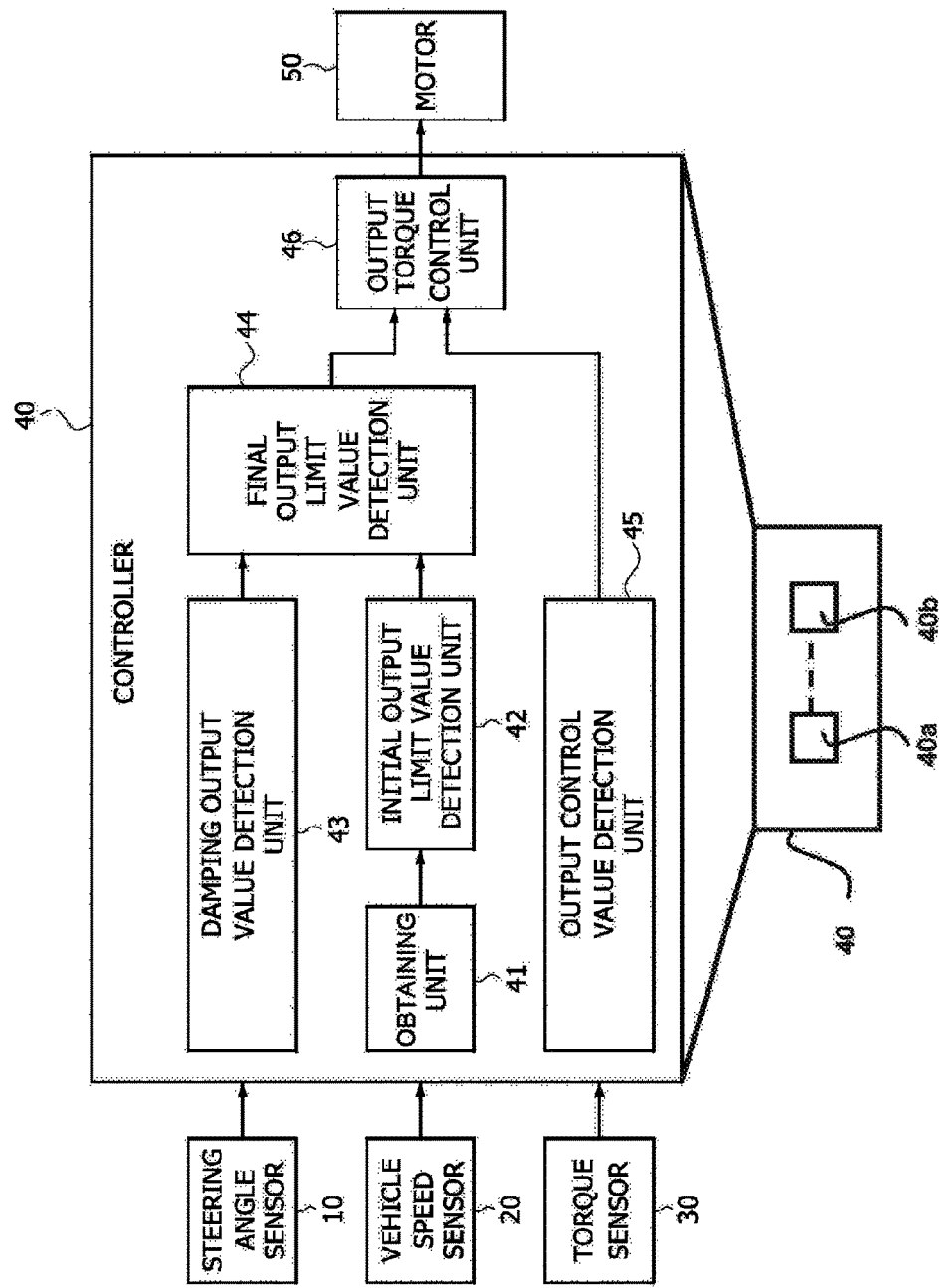
FIG. 1 is a block diagram illustrating a apparatus for controlling a MDPS system in accordance with an exemplary embodiment.

Hereinafter, exemplary embodiments of the present invention will be described in detail with reference to the accompanying drawings. Throughout the specification, like reference numerals denote like elements having the same or similar functions. Detailed description of components or functions apparent to those skilled in the art will be omitted for clarity. It should be understood that the following exemplary embodiments are provided by way of example and that the present invention is not limited to the exemplary embodiments disclosed herein and can be implemented in different forms by those skilled in the art. It should be noted that the drawings are not to precise scale and may be exaggerated in thickness of lines or sizes of components for descriptive convenience and clarity only.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It should be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

The MDPS system employs a rack end stop logic for reducing an impulse produced when a driver turns a steering wheel to the end of a steering angle.

The conventional rack end stop logic performs control only at a rack end stop control section which is set based on a steering angle or the position of a rack bar, and has a limitation in considering a mass production and distribution of hardware differences such as the length of the rack bar in a gear box or a left/right steering angle.

In particular, the rack end stop logic reduces an impulse by performing control at the end of a steering angle. Thus, when the position distribution of steering angles ends, it causes a big difference in the performance of the MDPS system.

Exemplary embodiments described below, provide a method for controlling a MDPS system configured to change a rack end stop control section based on a current position of a rack bar and configured to detect an output limit value of the MDPS system based on the changed rack end stop control section. Thus, exemplary embodiments avoid a performance difference caused by a mass production and distribution of rack bar lengths.

FIG. 1 is a block diagram illustrating a control apparatus for a MDPS system in accordance with an exemplary embodiment.

Referring to FIG. 1, the control apparatus for a MDPS system in accordance with the exemplary embodiment may include a steering angle sensor 10, a vehicle speed sensor 20, a torque sensor 30, a controller 40, and a motor 50. As illustrated in FIG. 1, the controller 40 includes an obtaining unit 41, an initial output limit value detection unit 42, a damping output detection unit 43, a final output limit value detection unit 44, an output control value detection unit 45, and an output toque control unit 46. In an exemplary embodiment, these various units of the controller 40 may be represented by a processor 40a coupled to memory 40b as shown in the lower portion of FIG. 1. The processor 40a may execute operations stored in memory 40b based on information received from memory 40b, the steering angle sensor 10, the vehicle speed sensor 20, the torque sensor 30, or the motor 50.

In an exemplary embodiment, the MDPS system may provide a steering force using the motor 50. The MDPS system may include a column MDPS (C-MDPS) system in which a motor 50 is coupled to a steering shaft (not illustrated), a pinion MDPS (P-MDPS) system in which a motor 50 is coupled to a pinion gear of a steering wheel shaft (not illustrated), and a rack MDPS (R-MDPS) system in which a motor 50 is coupled to a rack gear (not illustrated).

Exemplary embodiments are described below using the R-MDPS system. However, exemplary embodiments are not limited to an R-MDPS system and may include the P-MDPS system, the C-MDPS system, or any other suitable system. The R-MDPS system may receive a driving torque generated by the motor 50 and implement the axial movement of a rack bar (not illustrated). Thus, the R-MDPS system may convert a rotational force of the motor 50 into a linear moving force in the axial direction of the rack bar. For this operation, a belt, a pulley, a ball nut, a bearing and a screw-type rack bar may be used. That is, the ball nut is coupled to the rack bar while being rotatably supported by the bearing in a decelerator, a driving pulley is fixed to a driving shaft of the motor 50 such that the driven pulley transmits a rotational force to the ball nut coupled to the rack bar, and the driving pulley at the motor 50 and the driven pulley at the ball nut may be connected to each other through the belt, and transmit the rotational force of the motor 50 to the rack bar through the pulley and the belt. At this time, the rotational force of the motor 50 may be converted into the linear moving force of the rack bar by the ball screw structure of the ball nut and the rack bar.

The torque sensor 30 may detect a steering torque of the steering wheel (not illustrated) and input the detected steering torque to the controller 40.

The steering angle sensor 10 may detect a steering angle of the steering wheel and input the detected steering angle to the controller 40.

The vehicle speed sensor 20 may detect a vehicle speed and input the detected vehicle speed to the controller 40.

The controller 40 may detect an output control value according to a preset output control value output logic of the MDPS system, using the steering torque, the steering angle and the vehicle speed which are received from the torque sensor 30, the steering angle sensor 10 and the vehicle speed sensor 20, respectively. The controller 40 may detect a steering angular speed by receiving the steering angle or a rack movement speed associated with a motor rotation speed from the motor 50. The controller 40 may set a rack end stop control section based on the current position of the rack bar, and then control the output torque of the motor 50 based on the set rack end stop control section. As previously stated, the controller 40 may include an output control value detection unit 45, an obtaining unit 41, an initial output limit value detection unit 42, a damping output value detection unit 43, a final output limit value detection unit 44 and an output torque control unit 46.

Typically, when a driver performs a steering operation and turns a steering wheel by a full turn, the rack end stop function reduces the output torque of the motor 50 and limits a current applied to the motor 50, thereby minimizing an impact between a stopper of the rack bar and an IBJ socket (housing) of the gear box.

The rack end stop control section for this operation may indicate a position range of the rack bar immediately before the stopper of the rack bar and the IBJ socket (housing) of the gear box collides with each other. Thus, when the rack bar enters the rack end stop control section, the controller 40 may limit the output torque of the motor 50 and minimize an impact caused by the collision between the stopper of the rack bar and the IBJ socket of the gear box, thereby reducing noise caused by the impact while preventing a mechanical damage of the vehicle parts.

The rack end stop control section may be set based on the maximum position of the rack bar. For example, when the maximum position of the rack bar is set in the range of −77 to +77 in the left and right directions, the rack end stop control section may be set in the ranges of −77 to −70 and +70 to +77 with respect to the respective steering directions. In this case, when the current position of the rack bar enters the range of −77 to −70 or +70 to +77, the controller 40 may limit the output torque of the motor 50, thereby minimizing an impact between the stopper of the rack bar and the IBJ socket (housing) of the gear box.

As described above, the rack end stop control section may be set based on the maximum position of the rack bar. In this case, the maximum position of the rack bar may be set to a value different from a target value due to a hardware difference such as the length of the rack bar in the gear box or the distribution of left/right steering angles.

Thus, when a driver performs a steering operation and turns the steering wheel by a full turn, the controller 40 may detect the maximum position of the rack bar based on the current position of the rack bar, and set the rack end stop control section based on the detected maximum position. Then, when the current position of the rack bar reenters the rack end stop control section, the controller 40 may control the output torque of the motor 50 based on the set rack end stop control section.

For this operation, the obtaining unit 41 may detect the current position of the rack bar, compare the current position of the rack bar with the preset maximum position of the rack bar to generate a comparison result, and update the maximum position of the rack bar according to the comparison result.

The maximum position of the rack bar may include a maximum position of the rack bar, which was previously detected during a steering operation of a driver, in addition to the maximum position which is initially set during a manufacturing process.

The obtaining unit 41 may update the maximum position of the rack bar to the current position of the rack bar, when the comparison result between the current position of the rack bar and the maximum position of the rack bar indicates that the current position of the rack bar exceeds the maximum position of the rack bar.

In this case, the obtaining unit 41 may set a rack end stop control section based on the updated maximum position of the rack bar. Specifically, the obtaining unit 41 may shift the rack end stop control section by a difference between the current position of the rack bar and the maximum position of the rack bar. In this case, the obtaining unit 41 may shift the entry position and end position of the rack end stop control section by the difference between the current position of the rack bar and the maximum position of the rack bar.

Such a rack end stop control section may be set for each of the left steering direction and the right steering direction. Whenever a driver turns the steering wheel in the left or right direction such that the current position of the rack bar exceeds the maximum position of the rack bar, the obtaining unit 41 may independently set the rack end stop control section for each of the left steering direction and the right steering direction.

The initial output limit value detection unit 42 may detect the current position of the rack bar and the moving speed of the rack bar, and detect the initial output limit value using the current position and moving speed of the rack bar. Furthermore, the initial output limit value detection unit 42 may detect a preset vehicle speed gain corresponding to the vehicle speed, and then compensate for the initial output limit value. The initial output limit value may be stored in the form of a two-dimensional lookup table based on the current position and moving speed of the rack bar.

The damping output value detection unit 43 may detect a damping output value based on at least one of the steering speed, a rotational speed of the motor 50 and the moving speed of the rack bar. In this case, the damping output value may be preset for any one of the steering speed, the rotation speed of the motor 50 and the moving speed of the rack bar. The damping output value may be used for detecting the final output limit value by correcting the initial output limit value.

The final output limit value detection unit 44 may receive the initial output limit value from the initial output limit value detection unit 42 and the damping output value from the damping output value detection unit 43, and detect the final output limit value based on the initial output limit value and the damping output value.

In this case, the final output limit value detection unit 44 may calculate the final output limit value by subtracting the damping output value from the initial output limit value. In this case, when the damping output value is larger than the initial output limit value, the final output limit value may be set to a negative (−) value.

When the final output limit value is a positive (+) value, the output of the MDPS system may be limited, and when the final output limit value is a negative (−) value, the output of the MDPS system may be set in the opposite direction.

The output control value detection unit 45 may detect an output control value according to the preset output control value output logic of the MDPS system, based on the steering torque, the steering angle, and the vehicle speed which are inputted from the torque sensor 30, the steering angle sensor 10 and the vehicle speed sensor 20, respectively, and the steering angular speed detected through the steering angle.

At this time, the output control value detection unit 45 may detect the output control value according to the existing output control value output logic of the MDPS system. Thus, the output control value detection unit 45 may detect the output control value to which the rack end stop function is applied according to the existing method. Since the output control value output logic of the MDPS system can be generally employed during motor control of the MDPS system, the detailed descriptions thereof are omitted herein.

The output torque control unit 46 may receive the final output limit value from the final output limit value detection unit 44 and the output control value from the output control value detection unit 45, respectively, compare the final output limit value with the output control value, and control the motor 50 based on one of the final output limit value and the output control value, according to the comparison result.

That is, the output torque control unit 46 may control the output torque of the motor 50 according to the smaller value between the final output limit value and the output control value. For example, when the final output limit value is smaller than the output control value, the output torque control unit 46 may control the output torque of the motor 50 according to the final output limit value.

At this time, the operation of limiting the output torque of the motor 50 through the final output limit value or the like can be replaced with an operation of limiting the output current of the motor 50.

Furthermore, a steering angle detected by the steering angle sensor 10 or a steering angle detected through the motor rotation angle may be applied instead of the position of the rack bar, and a steering angular speed acquired through the steering angle or a steering angular speed acquired through the motor rotation speed may be applied instead of the moving speed of the rack bar.

Hereafter, a control method for a MDPS system in accordance with an exemplary embodiment will be described in detail with reference to FIG. 2.

Figure 2:
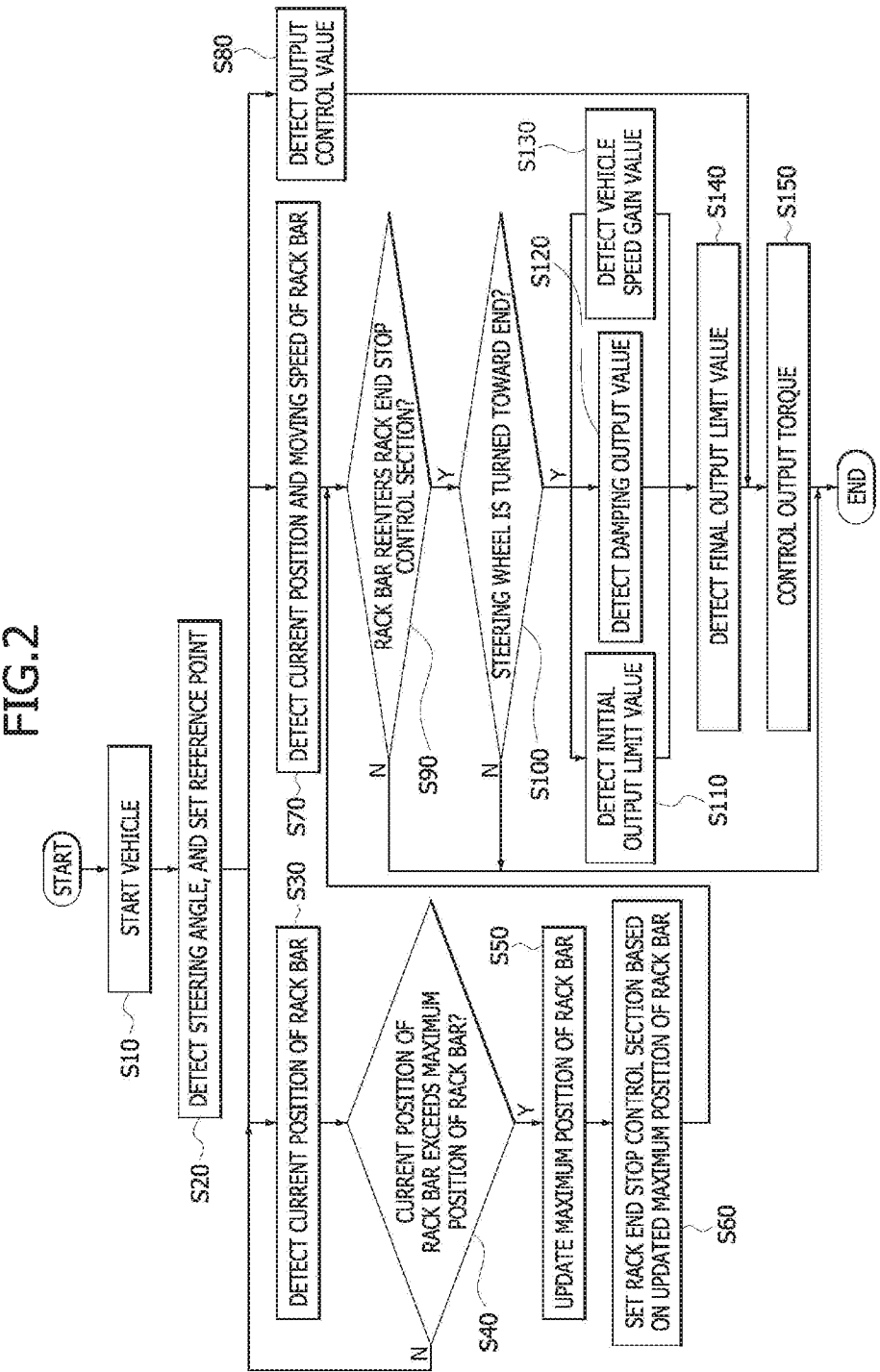
FIG. 2 is a flowchart illustrating a method for controlling a MDPS system in accordance with an exemplary embodiment.

FIG. 2 is a flowchart illustrating a control method for a MDPS system in accordance with an exemplary embodiment.

Referring to FIG. 2, when a vehicle is started at step S10, the steering angle sensor 10 may sense a steering angle of the steering wheel. Furthermore, the vehicle speed sensor 20 may sense a vehicle speed, and the torque sensor 30 may sense a steering torque.

At this time, the output control value detection unit 45 may detect the steering angle according to the preset output control value detection logic of the MDPS system, and set a reference point of the motor angle based on the steering angle at step S20.

The obtaining unit 41 may detect the current position of the rack bar at step S30, and compare the current position of the rack bar with a preset maximum position of the rack bar in order to determine whether the current position of the rack bar exceeds the maximum position of the rack bar at step S40.

When the determination result of step S40 indicates that the current position of the rack bar exceeds the maximum position of the rack bar, the obtaining unit 41 may update the maximum position of the rack bar to the current position of the rack bar at step S50.

The obtaining unit 41 may set a rack end stop control section based on the updated maximum position of the rack bar at step S60. That is, the obtaining unit 41 may detect a difference between the current position of the rack bar and the maximum position of the rack bar, and shift the entry position and end position of the rack end stop control section by the detected difference, thereby shifting the rack end stop control section.

The rack end stop control section may be independently set for each of the left steering direction and the right steering direction, whenever a driver turns the steering wheel in the left or right direction such that the current position of the rack bar exceeds the maximum position of the rack bar.

The initial output limit value detection unit 42 may detect the current position of the rack bar and the moving speed of the rack bar at step S70. The output control value detection unit 45 may detect an output control value according to the preset output control value output logic of the MDPS system, using the steering torque, the steering angle and the vehicle speed which are sensed by the torque sensor 30, the steering angle sensor 10 and the vehicle speed sensor 20, respectively, and a steering angular speed detected through the steering angle at step S80.

The initial output limit value detection unit 42 may determine whether the rack bar enters the rack end stop control section which was newly updated at step S60, based on at least one of the current position of the rack bar and the moving speed of the rack bar at step S90.

When the determination result of step S90 indicates that the rack bar enters the rack end stop control section, the initial output limit value detection unit 42 may determine the steering direction within the rack end stop control section, and determine whether the steering wheel is turned toward an end at step S100. That is, the initial output limit value detection unit 42 may determine whether the steering wheel is turned toward the right end when the steering direction is the right direction, or determine whether the steering wheel is turned toward the left end when the steering direction is the left direction.

When the determination result of step S100 indicates that the steering wheel is turned toward the right end within the rack end stop control section in the right direction or turned toward the left end within the rack-end-top control section in the left direction, the initial output limit value detection unit 42 may detect the initial output limit value based on the current position and moving speed of the rack bar at step S110, and the damping output value detection unit 43 may detect a damping output value based on at least one of the steering speed, the motor rotation speed and the moving speed of the rack bar at step S120.

The initial output limit value detection unit 42 may detect a preset vehicle speed gain corresponding to the vehicle speed and then compensate for the initial output limit value at step S130.

Then, the final output limit value detection unit 44 may receive the initial output limit value from the initial output limit value detection unit 42 and the damping output value from the damping output value detection unit 43, and detect the final output limit value by subtracting the received damping output value from the received initial output limit value at step S140.

When the final output limit value is detected as described above, the output torque control unit 46 may compare the final output limit value detected by the final output limit value detection unit 44 with the output control value detected by the output control value detection unit 45, and control the motor 50 based on one of the final output limit value and the output control value according to the comparison result at step S150. That is, the output torque control unit 46 may control the output torque of the motor 50 according to the smaller value between the final output limit value and the output control value. For example, when the final output limit value is smaller than the output control value, the output torque control unit 46 may control the output torque of the motor 50 according to the final output limit value.

The controller 40 and/or one or more components thereof (e.g., obtaining unit 41, initial output limit value detection unit 42, damping output value detection unit 43, final output limit value detection unit 44, output control value detection unit 45, or output torque control unit 46), may be implemented via one or more general purpose and/or special purpose components, such as one or more discrete circuits, digital signal processing chips, integrated circuits, application specific integrated circuits, microprocessors, processors (e.g., processor 40a), programmable arrays, field programmable arrays, instruction set processors, and/or the like. In this manner, the features, functions, processes, etc., described herein may be implemented via software, hardware (e.g., general processor, digital signal processing (DSP) chip, an application specific integrated circuit (ASIC), field programmable gate arrays (FPGAs), etc.), firmware, or a combination thereof. As such, the controller 40 and/or one or more components thereof may include or otherwise be associated with one or more memories (e.g., memory 40b) including code (e.g., instructions) configured to cause the controller 40 and/or one or more components thereof to perform one or more of the features, functions, processes, etc., described herein.

The memories (e.g., memory 40b) may be any medium that participates in providing code to the one or more software, hardware, and/or firmware components for execution. Such memories may be implemented in any suitable form, including, but not limited to, non-volatile media, volatile media, and transmission media. Non-volatile media include, for example, optical or magnetic disks. Volatile media include dynamic memory. Transmission media include coaxial cables, copper wire, and fiber optics. Transmission media can also take the form of acoustic, optical, or electromagnetic waves. Common forms of computer-readable media include, for example, a floppy disk, a flexible disk, hard disk, magnetic tape, any other magnetic medium, a compact disk-read only memory (CD-ROM), a rewriteable compact disk (CDRW), a digital video disk (DVD), a rewriteable DVD (DVD-RW), any other optical medium, punch cards, paper tape, optical mark sheets, any other physical medium with patterns of holes or other optically recognizable indicia, a random-access memory (RAM), a programmable read only memory (PROM), and erasable programmable read only memory (EPROM), a FLASH-EPROM, any other memory chip or cartridge, a carrier wave, or any other medium from which information may be read by, for example, a controller/processor.

As such, the method for controlling the MDPS system in accordance with an exemplary embodiment may change the rack end stop control section based on the end position of the rack bar, detect the output limit value of the MDPS system based on the changed rack end stop control section, and compensate for a performance difference caused by a mass production distribution of rack bar lengths.

Furthermore, the method can reduce an impulse produced when the steering wheel is turned to a steering angle end, thereby reducing an impact caused by a collision between the stopper of the rack bar and the IBJ socket (housing) of the gear box. Furthermore, the method can reduce noise caused by the impact while preventing a mechanical damage of the vehicle parts.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. A method for controlling a motor driven power steering (MDPS) system, comprising:
   detecting, by a controller, a current position of a rack bar;
   comparing, by the controller, the current position of the rack bar with a preset maximum position of the rack bar to generate a comparison result;
   updating, by the controller, a maximum position of the rack bar according to the comparison result; and
   setting, by the controller, a rack end stop control section using the updated maximum position of the rack bar.

2. The method of claim 1, wherein when the current position of the rack bar exceeds the preset maximum position of the rack bar, the controller updates the maximum position of the rack bar to the current position of the rack bar.

3. The method of claim 1, wherein the controller changes and sets the rack end stop control section depending on a difference between the current position of the rack bar and the maximum position of the rack bar.

4. The method of claim 3, wherein the controller shifts the rack end stop control section by the difference between the current position of the rack bar and the maximum position of the rack bar.

5. A method for controlling a motor driven power steering (MDPS) system, comprising:
   detecting, by a controller, a current position of a rack bar;
   obtaining, by the controller, a maximum position of the rack bar based on the current position of the rack bar;
   setting, by the controller, a rack end stop control section based on the maximum position of the rack bar;
   determining, by the controller, whether the current position of the rack bar reenters the rack end stop control section; and
   controlling, by the controller, an output torque of a motor according to the rack end stop control section, when the current position of the rack bar reenters the rack end stop control section.

6. The method of claim 5, wherein the setting of the rack end stop control section comprises:
   comparing the current position of the rack bar with a preset maximum position of the rack bar to generate a comparison result;
   updating the maximum position of the rack bar according to the comparison result; and
   setting the rack end stop control section using the updated maximum position of the rack bar.

7. The method of claim 5, wherein when the current position of the rack bar exceeds a preset maximum position of the rack bar, the controller updates the maximum position of the rack bar to the current position of the rack bar.

8. The method of claim 5, wherein the controller changes and sets the rack end stop control section depending on a difference between the current position of the rack bar and the maximum position of the rack bar.

9. The method of claim 8, wherein the controller shifts the rack end stop control section by the difference between the current position of the rack bar and the maximum position of the rack bar.

10. The method of claim 5, wherein the controlling of the output torque of the motor comprises:
    detecting a final output limit value of the motor based on at least one of the current position of the rack bar, a moving speed of the rack bar, and a preset vehicle speed gain;

detecting an output control value of the motor based on at least one of a steering angle, a steering torque, and the preset vehicle speed gain;

comparing the detected output control value with the final output limit value to generate an output comparison result; and controlling the output torque of the motor according to the output comparison result.

11. The method of claim 10, wherein the detecting of the final output limit value of the motor comprises:

detecting an initial output limit value of the motor based on at least one of the current position of the rack bar and the moving speed of the rack bar, and detecting the final output limit value by correcting the initial output limit value based on at least one of the moving speed of the rack bar and the preset vehicle speed gain.

12. The method of claim 11, wherein the detecting of the final output limit value of the motor comprises:

detecting a damping output value based on at least one of a steering speed of a steering wheel, a rotation speed of the motor, and the moving speed of the rack bar, and detecting the final output limit value by subtracting the damping output value from the initial output limit value.

13. The method of claim 10, wherein the controlling of the output torque of the motor comprises controlling the output torque of the motor based on one of the final output limit value and the output control value, according to the output comparison result.

* * * * *